United States Patent [19]

Henderson

[11] 4,108,393

[45] Aug. 22, 1978

[54] EMERGENCY LOCKING RETRACTOR WITH COMFORT BELT TENSION

[75] Inventor: Cyril Henderson, Woodland Hills, Calif.

[73] Assignee: American Safety Equipment Corporation, Encino, Calif.

[21] Appl. No.: 714,395

[22] Filed: Aug. 16, 1976

[51] Int. Cl.² .................. A62B 35/00; B65H 75/48
[52] U.S. Cl. .................. 242/107; 242/107.4 R
[58] Field of Search .................. 242/107–107.7; 280/744–747; 297/388; 185/37, 39

[56] References Cited

U.S. PATENT DOCUMENTS

| 3,834,646 | 9/1974 | Heath | 242/107.7 |
|---|---|---|---|
| 3,957,222 | 5/1976 | Bladh | 242/107 |
| 3,976,257 | 8/1976 | Fohl | 242/107 |
| 3,984,063 | 10/1976 | Knieriemen | 242/107 |
| 3,997,126 | 12/1976 | Karlsson | 242/107 |

FOREIGN PATENT DOCUMENTS 141,923  6/1976  Japan.

Primary Examiner—Harvey C. Hornsby
Assistant Examiner—John M. Jillions
Attorney, Agent, or Firm—Poms, Smith, Lande & Glenny

[57] ABSTRACT

A safety belt retractor having a belt storage spool biased toward a belt storage position is provided with means for selectively applying a portion of the rewind torque of the spool rewind spring back on to the spool in a belt unwinding direction to produce a reduced torque effect upon the spool.

15 Claims, 8 Drawing Figures

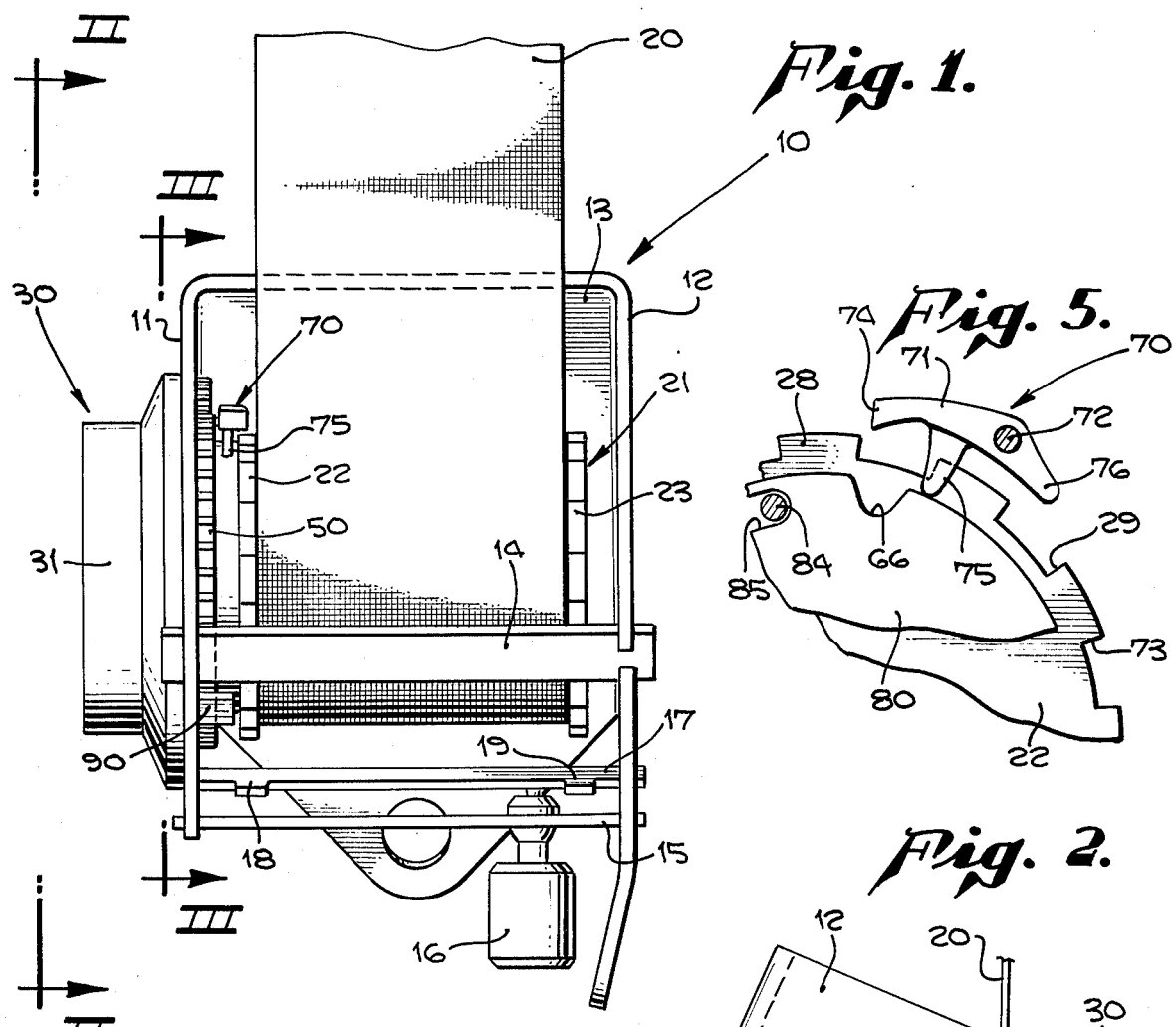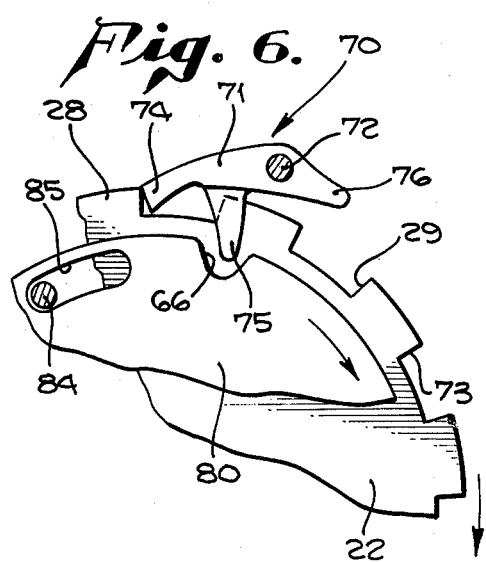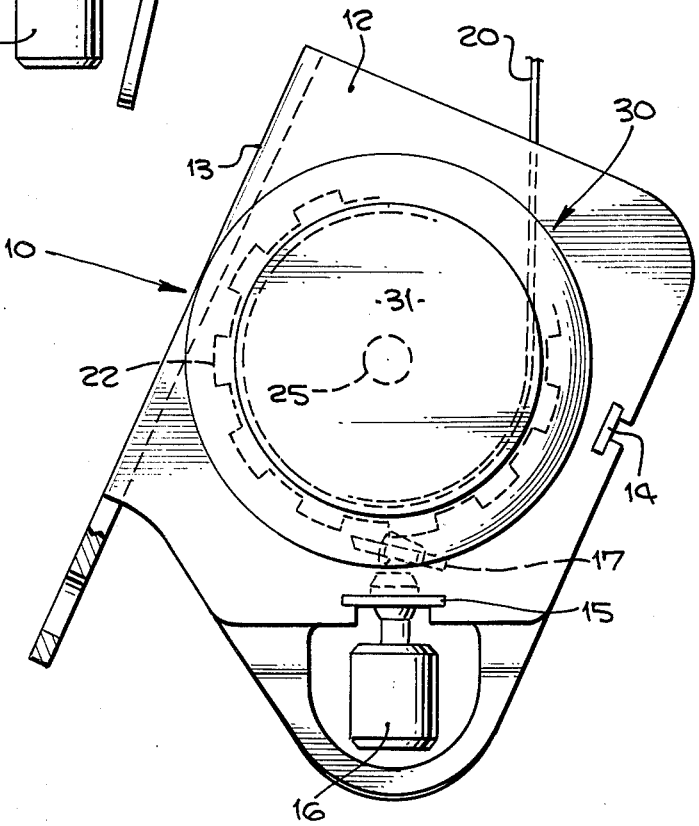

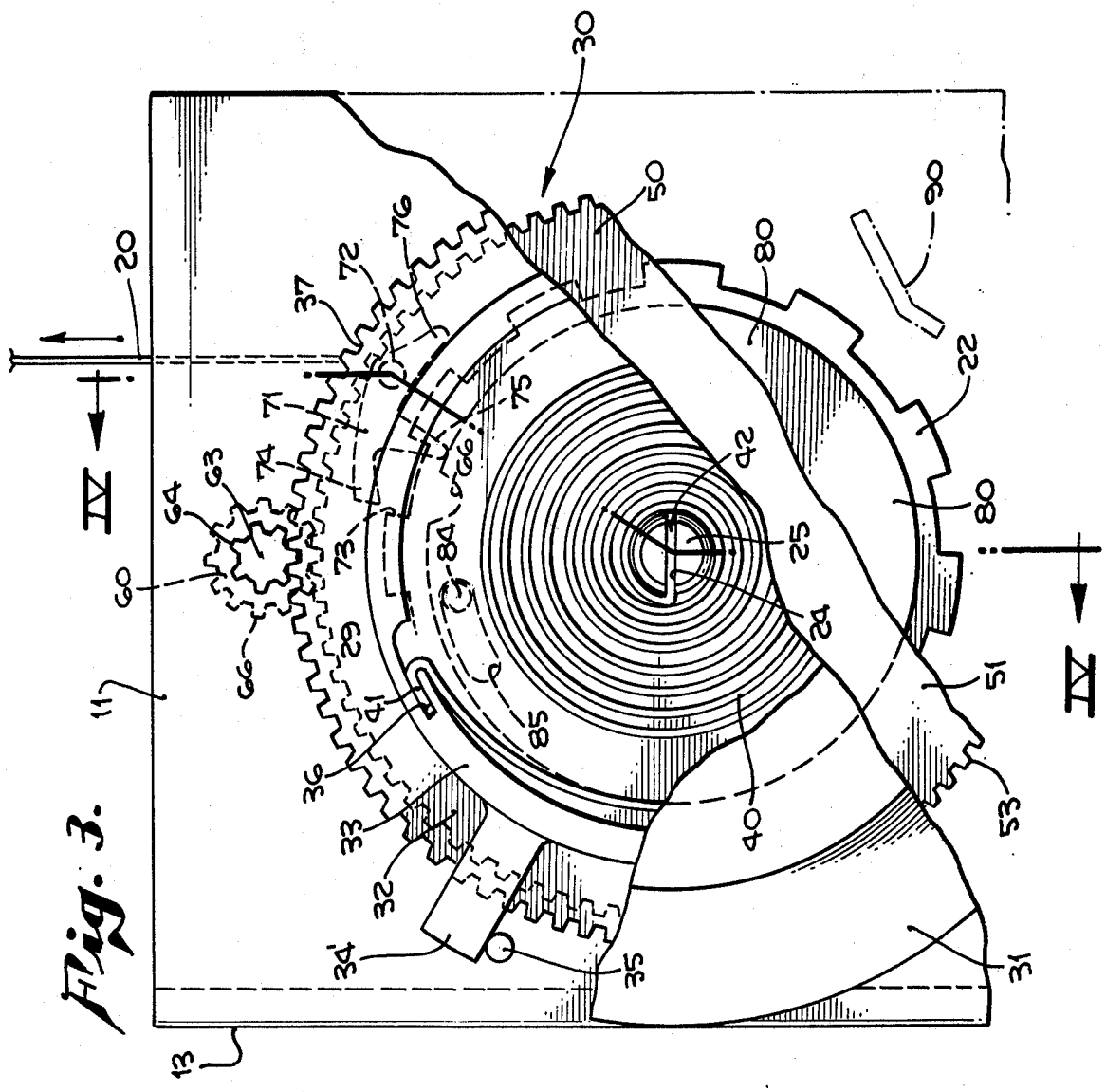

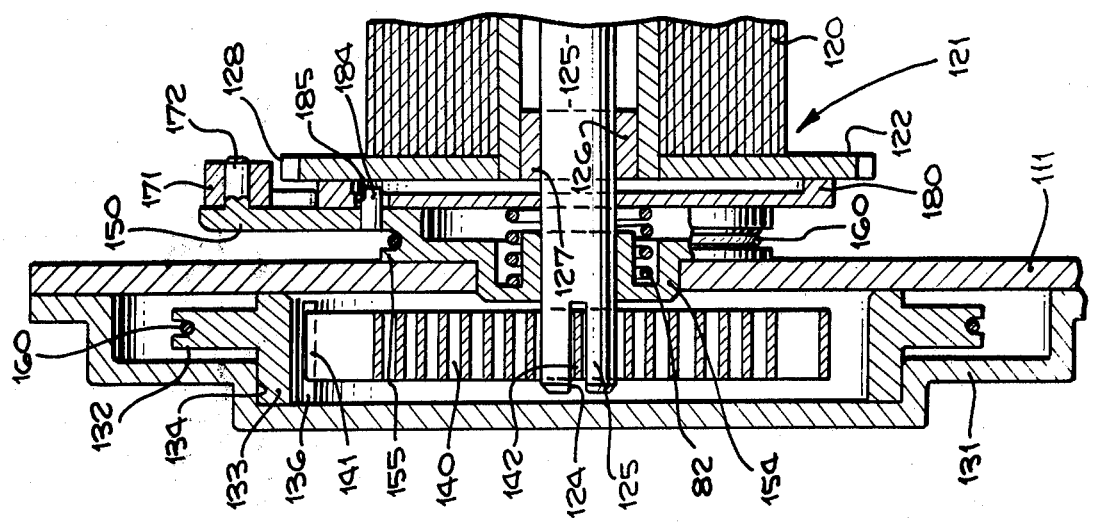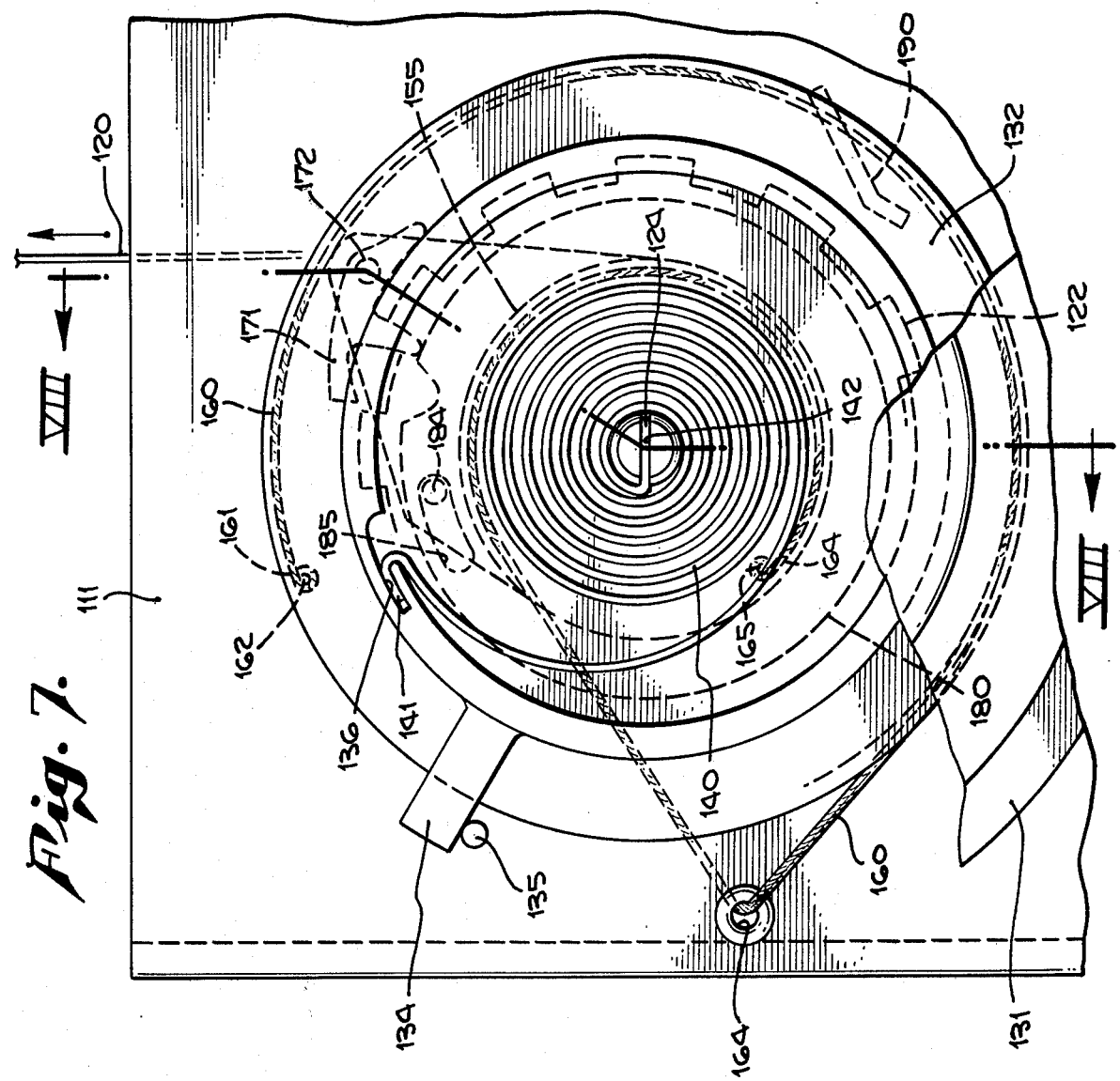

EMERGENCY LOCKING RETRACTOR WITH COMFORT BELT TENSION

BACKGROUND OF THE INVENTION

This invention relates in general to emergency locking safety belt retractors for vehicles wherein the safety belt allows freedom of movement of the passenger under the tension of the retractor rewind spring subject to locking up in the event of an emergency condition, and more specifically to means for reducing the tension applied to the belt when in use due to the retraction spring bias upon the belt.

Various types of safety belt harnesses employing various safety belts and straps are currently in use in automotive and air vehicles for restraining passengers in their seats in the event of an emergency condition. It is common practice to employ safety belt retractor devices in association with such harnesses and belt systems in order to store the belt or webbing when it is not in use. Because of the rewind spring employed to rewind the belt into the retractor, there is a certain tension applied by the rewind spring to the belt when it is placed about the passenger in use. It has been recognized heretofore that such tension can be objectionable to the vehicle passenger and various means have been employed heretofore for relieving or reducing the tension of the rewind spring on the belt when in use. One such prior attempt is disclosed in the prior U.S. Pat. No. 3,834,646 in which belt tension is completely relieved by means activated by a belt manipulation to hold the belt storage reel against retraction. However, it has been found to be desirable to have a low tension bias on the belt toward a rewind condition in order to avoid a slack belt condition and to facilitate employing means for automatically retracting the belt if it is merely disconnected when in the so-called "comfort zone" condition when the reduced tension is in affect.

In my prior co-pending U.S. patent application Ser. No. 635,413, filed Nov. 26, 1975, I have disclosed tension relieving means for safety belt retractors wherein additional means are provided for applying a low tension upon the safety belt when the bias of the main rewind spring is blocked from acting upon the belt. While the tension relieving means of my prior application is fully satisfactory, I have found it to be desirable to simplify the mechanism and employ a single spring for biasing the reel in both main rewinding and low tension rewinding modes.

SUMMARY OF THE INVENTION

It is a primary object of the present invention to disclose and provide an improvement in means for reducing the tension applied to a safety belt by the spool rewind spring of a vehicle safety belt retractor when the belt is in use without the need for additional springs or biasing means to produce a low tension "comfort zone" affect for the belt.

It is a further object of the present invention to disclose and provide an improvement in means for reducing the tension applied to a safety belt as in the foregoing object wherein the power of the single rewind spring normally employed in a safety belt retractor is selectively redirected in a manner to produce a net reduction in the tension applied to the safety belt by the spool under the action of the rewind spring.

Generally stated, the present invention comprises the provision of back torque applying means for selectively applying a portion of the rewind torque of the safety belt retractor rewind spring back on to the retractor spool in a belt unwinding direction to produce a reduced torque "comfort zone" condition for the belt when it is placed in use and manipulated in a predetermined manner, more specifically in response to a slight retraction movement of the belt following an initial protraction thereof.

As contemplated within the present invention, a safety belt retractor having a belt storage spool and a spool rewind spring connected at one end to the spool to bias the spool in a rewind direction is provided with means for selectively connecting the opposite end of the rewind spring to the spool to provide an opposite biasing effect on the spool to that applied by the first end acting on the spool. The means for selectively connecting the spring opposite end to the spool is provided so as to give a mechanical advantage to the spool, and thus the biasing of the first end of the spring, whereby the net effect on the spool is a reduced rewind bias and a reduced or "comfort zone" effect on the safety belt mounted to the retractor. In one exemplary embodiment of the present invention, gearing means are provided for interconnecting the opposite end of the spring to the spool while in a second exemplary embodiment pulley means are employed for interconnecting the spring opposite end and the spool for producing the back torque effect contemplated within the present invention.

A more complete understanding of the present invention, as well as how it achieves the aforestated objects and advantages thereof, will become apparent to those skilled in the art from a consideration of the following detailed description of two exemplary embodiments of the present invention. References will be made to the appended sheets of drawings which will be first briefly described.

BRIEF DESCRIPTION OF THE DRAWINGS

FIG. 1 is an elevational view of an exemplary embodiment of emergency locking safety belt retractor in which a first exemplary embodiment of the present improvement in means for reducing the tension applied to the safety belt when in use, in accordance with the present invention, is illustrated;

FIG. 2 is a side view of the retractor of FIG. 1 taken therein along the plane II—II;

FIG. 3 is a section view through the retractor of FIG. 1 taken therein along the plane III—III;

FIG. 4 is a section view of the retractor of FIG. 3 taken therein along the plane IV—IV;

FIG. 5 is a detail view taken in FIG. 4 along the plane V—V;

FIG. 6 is a detail view as in FIG. 5 showing pawl means engaging ratchet means to place the exemplary embodiment of means for reducing the tension applied to the belt when in use in operating condition;

FIG. 7 is a side view of a second exemplary embodiment in means for reducing the tension applied to the belt when in use, according to the present invention, which may be incorporated in the retractor of FIG. 1; and FIG. 8 is a section view of the exemplary embodiment of FIG. 7 taken therein along the plane VIII—VIII.

DETAILED DESCRIPTION OF THE PREFERRED EXEMPLARY EMBODIMENT

An exemplary embodiment of emergency locking type safety belt retractor illustrated in FIG. 1 generally at 10 and, as is conventional, includes a generally U-shaped frame comprising side walls 11 and 12 formed integrally with base 13. Spacer bars 14 and 15 provide structural rigidity to the frame with bar 15 also serving to pivotally mount an inertia rsponsive pendulum 16 which is provided in known manner to actuate a lock bar 17 having teeth 18 and 19. A safety belt 20 is wound upon a conventional spool, indicated generally at 21, having ratchet wheels 22 and 23 fixed thereto. The retractor frame may be mounted to a vehicle frame in conventional manner to place the associated safety belt 20 in position to be drawn from the retractor and placed in use about the passenger when associated with conventional buckling means provided in the vehicle. An exemplary retractor in which the present improvement in means for reducing the tension applied to the belt when in use may be employed is disclosed in the copending application for U.S. Ser. No. 627,875 filed Oct. 31, 1975 and owned by the assignee of the within application. The disclosure of retractor mechanism of said United States application is incorporated herein by this reference.

As is apparent to those skilled in the art, the retractor illustrated generally at 10 in FIGS. 1 and 3, will lock up, preventing further belt unwinding or protraction, in an emergency condition when pendulum 16 swings under changing inertia conditions and causes lock bar 17 to engage with the teeth of the ratchet wheels 22 and 23. Thus far, the retractor mechanism described is conventional. However, as contemplated within the present invention, an improved means is disclosed herein for reducing the tension applied to belt 20 when the belt is placed in use.

Referring now to FIGS. 1, 3 and 4, the preferred exemplary embodiment in means for reducing the tension applied to the belt when in use comprises means for selectively applying a portion of the rewind torque normally applied by the rewind spring to the spool in a belt unwinding direction to produce a net reduced torque affect upon the spool. Such means are illustrated generally at 30 in the preferred exemplary embodiment within the housing 31 secured by appropriate fastening means to side wall 11 of the retractor. Such means, in the first exemplary embodiment, initially comprise the provision of a ring gear 32 having a cylindrical portion 33 fitted within cylindrical recess 34 of housing 31 to rotatably mount ring gear 32 within housing 31 against side wall 11. The counter clockwise rotation of ring gear 32, as viewed in FIG. 3, is limited by the provision of a first stop portion 34' on ring gear 32 which is adapted to abut a stop pin 34 mounted to the retractor side wall 11. The outer end 41 of coil spring 40 is fitted within slot 36 of the ring gear to interconnect the outer free end of spring 40 with the ring gear. Spring free end 41 is held against clockwise rotation when ring gear 32 has rotated fully counter clockwise in FIG. 3 against stop pin 35 as seen in FIG. 3. An inner end 42 of spring 40 is fitted within end slot 24 of spool shaft 25 as seen in FIGS. 3 and 4 to normally bias shaft 25 in a belt rewind direction.

As seen in FIG. 4, the safety belt spool, indicated generally at 21, comprises a tubular spool base 26 to which the ratchet wheels 22 and 23 are fixed and is in turn non-rotatably fixed to shaft 25 by conventional spacer means as bushing 27 shown press fit between shaft 25 and spool base 26 in FIG. 4. From the foregoing, it can be seen that spring 40 will normally bias spool shaft 25 in a clockwise direction in FIG. 3 attempting to wind belt 20 back on to the retractor spool whenever the belt is protracted to a position of use.

Back torque applying means are provided for selectively applying a portion of the rewind torque of spring 40 back on to the spool indicated generally at 21, in a belt unwinding direction to produce a reduced torque effect upon the spool. In the preferred exemplary embodiment, such means includes the aforedescribed ring gear 32, a second gear 50, and interconnecting reducing gear 60 and means indicated generally at 70 for selectively connecting gear 50 to the spool as hereinafter explained. As best seen in FIG. 4, second gear 50 is of generally disc configuration and includes a disc body 51 having an internal recess 52 and external gear teeth 53. A central hub 54 rotatably mounts gear 50 on shaft 25 to be freely rotatably thereabout.

Reducing gear means 60 are interposed between ring gear 32 and gear 50 as seen in FIGS. 3 and 4 in the exemplary embodiment. Gear 60 is rotatably mounted by a central portion 61 within an aperture 62 in side wall 11 and is of stepped configuration in providing a smaller gear portion 63 having external teeth 64 meshing with teeth 37 of gear 32 exteriorly of wall 72 and a larger diameter gear means 65 having teeth 66 meshing with teeth 53 of gear 50 internally of wall 11. As described hereinafter, gear 50 is given a mechanical advantage over gear 32 by the arrangement of interconnecting gear 60 thus described.

Means are provided for selectively interconnecting gear 50 with the spool indicated generally at 21. In the exemplary embodiment, such means, indicated generally at 70, comprise the provision of pawl 71 mounted by pivot pin 72 to gear 50 which functions in the present embodiment also as a pawl carrier for carrying pawl 71 for rotation about shaft 25 as discussed hereinafter. Pawl 71 is adapted to engage teeth of the ratchet wheel 22 to interconnect gear 50 with the spool as seen in FIG. 6. In the preferred embodiment, square teeth 28 are preferably provided on ratchet wheel 22 so that a first side 29 may be engaged by lock bar 17 as aforedescribed while a second side 73 may be engaged by the pawl tooth 74, as seen in FIG. 6, to interconnect gear 50 and spool ratchet wheel 22. As seen from the foregoing, when pawl 71 engages a tooth of spool ratchet wheel 22, the outer end of spring 40 is interconnected through gears 32, 60 and 50 to the spool applying a back torque of the biasing spring 40 upon the spool in a direction promoting a belt unwinding movement of the spool counteracting the belt winding action of the inner end of spring 40 on shaft 25. By virtue of the provision of a mechanical advantage to gear 50 over gear 32, a reduced tension affect can be achieved for belt tension when the belt is placed in use and pawl means 71 is interconnected with spool ratchet wheel 22. The precise arrangement of gearing for producing a desired reduced torque affect on the webbing can be computed as follows:

Assuming: TM = Main Spring 40 torque
TP = Pawl Carrier 50 back torque
TW = Belt 20 torque
and for equilibrium when pawl 71 is engaged with ratchet wheel 22 that:

$$TM = TP + TW$$

Then:

$$TP = TM/R$$

$$\therefore TW = TM[1 - (1/R)]$$

or $$TW/TM = [1 - (1/R)]$$

where R = (N4/N3) × (N2/N1) and

N1 is the number of teeth 53 for gear 50; N2 is the number of teeth 66 of gear means 65; N3 is the number of teeth 64 of gear means 63; and N4 is the number of teeth 37 of gear 32. It may be seen to those skilled in the art from the foregoing, that the desired belt torque or level of reduced tension can be computed via the foregoing computations to determine the number of teeth required for gears 32, 60 and 50 to obtain a desired reduced torque or reduced tension affect for the belt 20 where a known torque of the rewind spring is provided.

Means are provided for maintaining pawl 71 out of engagement with ratchet wheel teeth 28 during unwinding of belt 20 which allows engagement of pawl 71 with teeth 28 upon a slight retraction movement of belt 20 after it has been placed in use. Such means in the exemplary embodiment comprise the provision of cam means including cam disc 80 which is rotatably mounted about shaft 25 and biased by spring 81 against spool ratchet wheel 22 as seen in FIG. 4. Spring 81 is fitted within a recess 82 in gear 50 and presses against disc 80 to force its annular peripheral surface 83 in a frictional drive relation with wheel 22. Rotation of disc 80 relative to pawl carrier gear 50 is limited by the provision of pin 84 on gear 50 which fits within slot 85 in disc 80 as seen in FIGS. 3 and 4. On an unwinding movement of belt 20, spool ratchet wheel 22 rotates counter clockwise in FIG. 3 causing cam disc 80 to rotate counter clockwise within the limits allowed by pin 84. In this position, cam 80 underlies cam follower portion 75 of pawl 71 to hold pawl tooth 74 out of engagement with teeth 28 of ratchet wheel 22. When belt 20 has been protracted (unwound) to a position of use, there is normally a slight retraction (rewinding) movement following buckling up of the safety belt. This slight retraction movement of belt 20 causes a clockwise rotation of spool ratchet wheel 22 and frictionally driven disc 80, within the limits allowed by pin 84 as seen in FIG. 6, to bring cam recess 66 beneath pawl follower 75 and thus allow pawl lock up with the ratchet wheel teeth 28.

When the retractor is in the reduced belt tension or "comfort zone" effect provided by the back torquing of spring power of spring 40 on to the spool when pawl 71 engages ratchet wheel 22 as aforedescribed, the net reduced tension effect biases the spool in a belt winding direction and causes gear 32 and gear 50 to rotate clockwise in FIG. 3 providing a low tension winding movement of belt 20 avoiding any slack belt condition for a predetermined length of belt travel, according to the present invention, determined by means for releasing pawl 71 automatically when a predetermined comfort zone rewind has occurred. In the exemplary embodiment, such means for deactivating pawl 71 comprises the provision of a cam ramp 90 provided on retractor side wall 11 at an arcuate distance from the position of pawl 71 when it initially engages with the ratchet teeth 28 as seen in FIG. 3. When the rear end 76 of pawl 71 engages ramp 90, it is pivoted about its pivot pin 72 to release spool ratchet 22, disconnect the gearing means from the spool and allow for a return of the gearing means to the position of FIG. 3 and a rewind of belt 20 under the full tension of spring 40.

SECOND EXEMPLARY EMBODIMENT

Referring now to FIGS. 7 and 8, an alternative exemplary embodiment is illustrated in which pulley means are provided in place of the aforedescribed gear means for applying a back torque upon the spool to effect a reduced tension in the safety belt when placed in use. This alternative exemplary embodiment is illustrated in use with the exemplary emergency retractor of FIG. 1 wherein belt 120 is mounted on a spool, indicated generally at 121 and including ratchet wheels, as ratchet wheel 122 spool shaft 125, spool base 126 and spacer 127 as aforedescribed operating in association with the retractor frame including side wall 111. In this embodiment, spring 140 has its outer free end 141 fitted within a slot 136 of a first pulley means 132. Pulley means 132 is mounted as gear 32 by a cylindrical ring portion 133 fitted within cylindrical recess 134 in housing 131. Inner end 142 of spring 140 is fitted within end slot 124 of shaft 125. Counter clockwise rotation of pulley means 132 in FIG. 7 is limited by stop 134 which is adapted to abut stop pin 135 mounted to side wall 111. Spring 140 thus biases the belt spool in a belt winding direction, clockwise in FIG. 7, as in the prior embodiment.

A second pulley means 150 is provided interiorly of wall 111 and is rotatably mounted by hub 154 on shaft 125. Pulley 150 mounts pawl 171, via pivot pin 172, for a selective engagement with teeth 128 of ratchet wheel 122 under the control of friction disc 180 as in the aforedescribed embodiment. Disc 180 is biased by spring 82 and is provided with a limit slot 185 engaging pin 184 as in the prior embodiment.

Belt means, comprising rope 160, are provided for interconnecting pulley means 132 with pulley means 150. As seen in FIG. 7, one end 161 of pulley rope 160 is secured by a pin 162 to the large diameter pulley 132 and extends thereabout and through aperture guide 163 through wall 111 to wind about and be secured at its opposite end 164 by pin 165 to the smaller working diameter of portion 155 of pulley 150. When pawl 171 engages the spool ratchet wheel 122 in this embodiment under belt manipulation as described in the prior embodiment, the spring torque 140 will be acting against itself on spool 121 through pulley means 132 and 150 and their interconnecting pulley rope 160 to produce a net effect of a reduced tension upon belt 120 to be felt by the passenger utilizing the safety belt. On a rewind motion of the spool in this "comfort zone" affect of a predetermined amount, as in the prior embodiment, pawl 171 will be released by ramp 190 and the full torque of spring 140 will be reapplied to spool 121 without the back torquing effect described hereinbefore.

It should be apparent to those skilled in the art, from a consideration of the prior detailed description of two preferred exemplary embodiments of the improvement in means for reducing the tension applied to a safety belt when in use which is normally due to the bias of the rewind spring, that the objects and advantages stated hereinbefore for the within invention have been attained. A single spring for applying a rewind bias on the retractor spool has been employed with means for applying a back torque upon the spool emanating from the spring through exemplary gearing and pulley means to effect a reduced belt tension condition when the belt is in use. Moreover it should be understood by those skilled in the art that various other alternatives, modifications and adaptations of the within invention may be made within the scope and spirit of the present invention which is defined by the following claims.

I claim:

1. In a safety belt retractor having a belt storage spool and a single spool rewind spring means connected at one end to said spool to produce a first rewind bias on said spool, the improvement in means for reducing the tension applied to the belt when in use due to the bias of said single rewind spring means, comprising the provision of:

means for selectively connecting an opposite end of said spring means to said spool, said means for selectively connecting including means for providing an opposite biasing effect on said spool of a lesser amount than that applied by said one end on said spool, whereby the net effect on said spool will be a second rewind bias on said spool by said single rewind spring means of a lesser amount than said first bias.

2. The improvement in safety belt retractor of claim 1 wherein said means for providing an opposite biasing effect comprises:

torque reducing gearing means for interconnecting said opposite end of said single spring means to said spool, to provide said lesser opposite biasing effect.

3. In a safety belt retractor having a belt storage spool and a spool rewind spring connected at one end to said spool, the improvement in means for reducing the tension applied to the belt when in use due to the bias of said rewind spring, comprising the provision of:

means for selectively connecting an opposite end of said spring to said spool to provide an opposite biasing effect on said spool to that of said one end on said spool and to give a mechanical advantage to said spool whereby the net effect on said spool will be a reduced rewind bias on said spool by said spring, wherein:

said means for selectively connecting comprises gearing means for interconnecting said opposite end of said spring to said spool, and said gearing means comprises:

a ring gear rotatably mounted on said retractor, having external gear teeth and being connected to said spring second end;

a second gear connectable to said spool; and torque reducing gear means interposed between said ring gear and said second gear for reducing torque applied by said ring gear through said torque reducing gear means to said second gear.

4. The improvement in safety belt retractor as in claim 3 wherein said spool is provided with ratchet teeth and a spool shaft and said second gear comprises a pawl carrier rotatably mounted about said spool shaft and having external gear teeth and a pawl member pivotally mounted thereon for engagement with said ratchet teeth.

5. In a safety belt retractor having a belt storage spool and a spool rewind spring connected at one end to said spool, the improvement in means for reducing the tension applied to the belt when in use due to the bias of said rewind spring, comprising the provision of:

means for selectively connecting an opposite end of said spring to said spool to provide an opposite biasing effect on said spool to that of said one end on said spool;

said means for selectively connecting including means to give a mechanical advantage to said spool whereby the net effect on said spool will be a reduced rewind bias on said spool by said spring, and wherein said means for selectively connecting further comprises:

pulley means for interconnecting said opposite end of said spring to said spool.

6. The improvement in safety belt retractor of claim 5 wherein said pulley means comprises:

a first pulley means rotatably mounted on said retractor and connected to said spring second end;

a second pulley means connectable to said spool and having a smaller working diameter than that of said first pulley means; and belt means interposed between said first pulley means and said second pulley means for transferring torque applied by said first pulley means to said second pulley means.

7. The improvement in safety belt retractor as in claim 6 wherein said spool is provided with ratchet teeth and a spool shaft and said second pulley means comprises a pawl carrier rotatably mounted about said spool shaft and having a pawl member pivotally mounted thereon for engagement with said ratchet teeth.

8. In a safety belt retractor having a belt storage spool and a single torque applying means for applying a belt rewind torque of a first amount upon the spool when the belt is protracted from the spool, the improvement comprising the provision of:

back torque applying means for selectively applying a portion only of said rewind torque of said single torque applying means back on to said spool in a belt unwinding direction to produce a reduced torque effect upon said spool of a second rewind torque on said spool of an amount able to rewind said spool and belt but of a lesser amount than said first amount.

9. The improvement in safety belt retractor of claim 8 comprising:

means for operating said back torque applying means in response to a slight retraction movement of said belt following an initial protraction thereof.

10. The improvement in safety belt retractor of claim 9 comprising:

means for deactivating said operating means upon a further retraction movement of said belt of more than a predetermined amount.

11. In a safety belt retractor having a belt storage spool and torque applying means for applying a belt rewind torque upon the spool when the belt is protracted from the spool, the improvement comprising the provision of:

back torque applying means for selectively applying a portion of said rewind torque back on to said spool in a belt unwinding direction to produce a reduced torque effect upon said spool;

means for operating said back torque applying means in response to a slight retraction movement of said belt following an initial protraction thereof; and means for deactivating said operating means upon a further retraction movement of said belt of more than a predetermined amount.

12. In a safety belt retractor having a belt storage spool and torque applying means for applying a belt rewind torque upon the spool when the belt is protracted from the spool, the improvement comprising the provision of:

back torque applying means for selectively applying a portion of said rewind torque back on to said spool in a belt unwinding direction to produce a reduced torque effect upon said spool, wherein ratchet means are connected to said spool and said torque applying means comprises a coil spring having one end connected to the spool and a second end, and said back torque applying means comprises:

a ring gear rotatably mounted to said retractor and having said spring second end attached thereto in driving relation;

a second gear rotatably mounted to said retractor and mounting pawl means engagable with said ratchet means; and stepped gear means interposed between said ring gear and said second gear for providing a mechanical advantage to said second gear.

13. The improvement in safety belt retractor of claim 12 comprising:

cam means frictionally driven off of rotation of said spool for selectively blocking said pawl from engaging said spool ratchet during protraction of said belt and for allowing engagement of said pawl with said spool ratchet upon a slight retraction movement of said belt following an initial protraction thereof.

14. In a safety belt retractor having a belt storage spool and torque applying means for applying a belt rewind torque upon the spool when the belt is protracted from the spool, the improvement comprising the provision of:

back torque applying means for selectively applying a portion of said rewind torque back on to said spool in a belt unwinding direction to produce a reduced torque effect upon said spool, wherein ratchet means are connected to said spool and said torque applying means comprises a coil spring having one end connected to the spool and a second end, and said back torque applying means comprises:

a first pulley means rotatably mounted to said retractor and having said spring second end attached thereto in driving relation;

a second pulley means, having a smaller working diameter than that of said first pulley means, rotatably mounted to said retractor and mounting pawl means engagable with said ratchet means; and belt means interposed between said first pulley means and said second pulley means for transferring torque applied by said first pulley means to said second pulley means.

15. The improvement in safety belt retractor of claim 14 comprising:

cam means frictionally driven off of rotation of said spool for selectively blocking said pawl from engaging said spool ratchet during protraction of said belt and for allowing engagement of said pawl with said spool ratchet upon a slight retraction movement of said belt following an initial protraction thereof.

* * * * *